United States Patent [19]

Ichiyama

[11] Patent Number: 5,166,913
[45] Date of Patent: Nov. 24, 1992

[54] OPTICAL DISK DEVICE FOR RECORD AND REPRODUCTION OF ADDITIONAL INFORMATION BESIDES REPRODUCING OF BASIC INFORMATION

[75] Inventor: Yoshikazu Ichiyama, Tokyo, Japan

[73] Assignee: NEC Corporation, Tokyo, Japan

[21] Appl. No.: 759,810

[22] Filed: Sep. 16, 1991

Related U.S. Application Data

[63] Continuation of Ser. No. 302,277, Jan. 27, 1989, abandoned.

[30] Foreign Application Priority Data

Jan. 27, 1988 [JP] Japan .................... 63-17910

[51] Int. Cl.⁵ .................. G11B 7/12; G11B 11/10; G11B 11/12; G11B 13/04
[52] U.S. Cl. ...................... 369/13; 369/14; 369/124; 369/275.1; 369/275.2; 369/275.4; 360/59; 360/114
[58] Field of Search .............. 369/13, 14, 275.1, 275.2, 369/275.4, 110, 124; 360/114, 59

[56] References Cited

U.S. PATENT DOCUMENTS

| | | | |
|---|---|---|---|
| 4,716,560 | 12/1987 | Itonaga | 369/275.2 |
| 4,730,289 | 3/1988 | Saito et al. | 369/13 |
| 5,020,040 | 5/1991 | Lee | 369/13 |
| 5,023,856 | 6/1991 | Raaymakers et al. | 369/275.1 |
| 5,031,162 | 7/1991 | Morimoto et al. | 369/275.1 |

FOREIGN PATENT DOCUMENTS

| | | | |
|---|---|---|---|
| 0178116 | 4/1986 | European Pat. Off. | 369/275.1 |
| 57-55548 | 4/1982 | Japan | 369/14 |
| 60-57558 | 4/1985 | Japan | 369/14 |
| 60-157740 | 8/1985 | Japan | 369/275.1 |

Primary Examiner—Hoa Nguyen
Attorney, Agent, or Firm—Sughrue, Mion, Zinn, Macpeak & Seas

[57] ABSTRACT

An optical disk includes a substrate disk and an additional recording layer formed on a surface of the substrate disk. A series of pits and lands is formed on the surface of the substrate disk for recording basic information which includes address and data information along a basic recording track. The additional recording layer is for voluntarily and additionally recording additional information along an additional recording track positioned over the basic recording track. The basic and additional information can be reproduced by a basic information reproducing circuit and additional information recording and reproducing circuit, respectively. The additional information recording and reproducing circuit also records an additional information along the additional recording track so that the additional information is recorded over portions where the data information of the basic information is recorded.

6 Claims, 2 Drawing Sheets

OPTICAL DISK DEVICE FOR RECORD AND REPRODUCTION OF ADDITIONAL INFORMATION BESIDES REPRODUCING OF BASIC INFORMATION

This is a continuation of application Ser. No. 07/302,277 filed Jan. 27, 1989 now abandoned.

BACKGROUND OF THE INVENTION

This invention relates to an optical disk, such as a video disk, a compact disk, or a compact disk read-only memory, and an optical disk device for recording information on an optical disk and for reproducing the information therefrom.

An optical disk has a recording surface on which information is recorded as surface irregularities or surface deformations representative of the information. Typically, the surface irregularities consist of pits formed along a record track with a land left between two adjacent ones of the pits. The pits and the lands have different lengths along the record track in accordance with the information. In connection with the different lengths, it is possible to understand that the surface irregularities are formed along the record track with a predetermined desity of record.

The optical disk has a very large memory capacity because each of such record tracks is only about one micron wide. In addition, it is possible to manufacture a great number of replicas or reproductions from a master or prototype optical disk. The optical disks are therefore believed to be prosperous as media for use as electronic publications.

It should, however, be noted that a conventional optical disk is for use only in reproducing or reading the information which is already recorded thereon as basic information. It is impossible for a reader of the basic information to voluntarily add additional information, such as an underscore or a comment, to the basic information in contrast to conventional printed publications. It is also impossible for an author of the basic information to partly change the basic information for a revised edition. This incapability of recording and reproducing additional information is disadvantageous to a wider use of the optical disks as electronic publications.

SUMMARY OF THE INVENTION

It is therefore an object of the present invention to provide an optical disk to which a user can desiredly add additional information to basic information which is already recorded on the optical disk.

It is another object of this invention to provide an optical disk of the type described, which will widen use of such optical disks as electronic publications.

It is a further object of this invention to provide an optical disk device for use in recording additional information on an optical disk in addition to basic information already recorded thereon and in reproducing the additional information as well as the basic information from the optical disk.

Other objects of this invention will become clear as the description proceeds.

According to an aspect of this invention, there is provided an optical disk comprising: (a) a substrate disk having a recording surface on which basic information is recorded in a first mode of using surface irregularities; and (b) a layer of an information recording medium on the recording surface for recording and reproducing of additional information in a second mode which is different from the first mode.

According to another aspect of this invention, there is provided an optical disk device comprising: (a) a basic information reproducing circuit for reproducing a basic reproduction from basic information recorded on a recording surface of an optical disk in a first mode of using surface irregularities; and (b) an additional information recording and reproducing circuit for recording additional information in a second mode different from the first mode in a layer formed of an information recording medium on the recording surface and for reproducing an additional reproduction from the additional information recorded in the information recording medium layer in the second mode.

Figure 1:
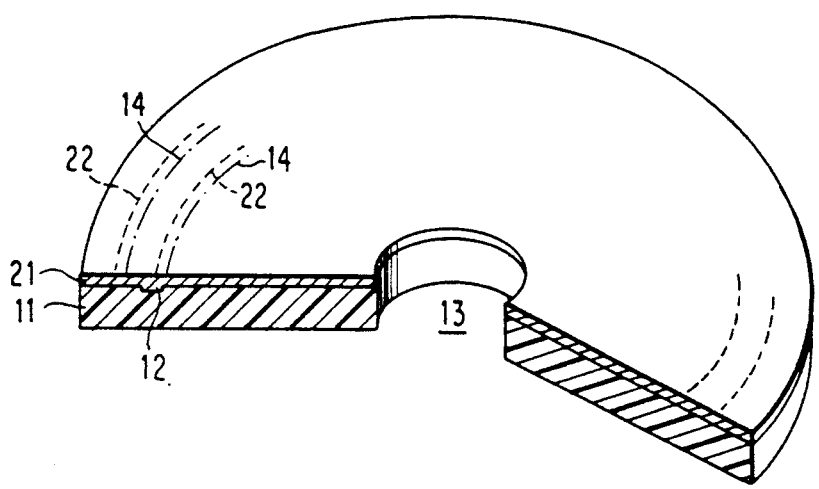
FIG. 1 is a schematic partly cut-away perspective view of an optical disk according to a first embodiment of the instant invention.
Figure 3:
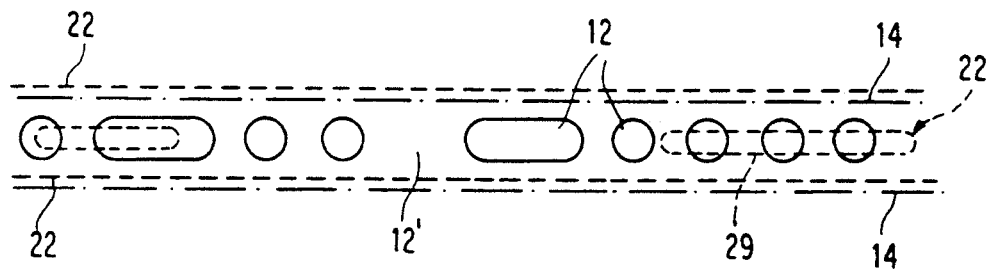
Figure 2:
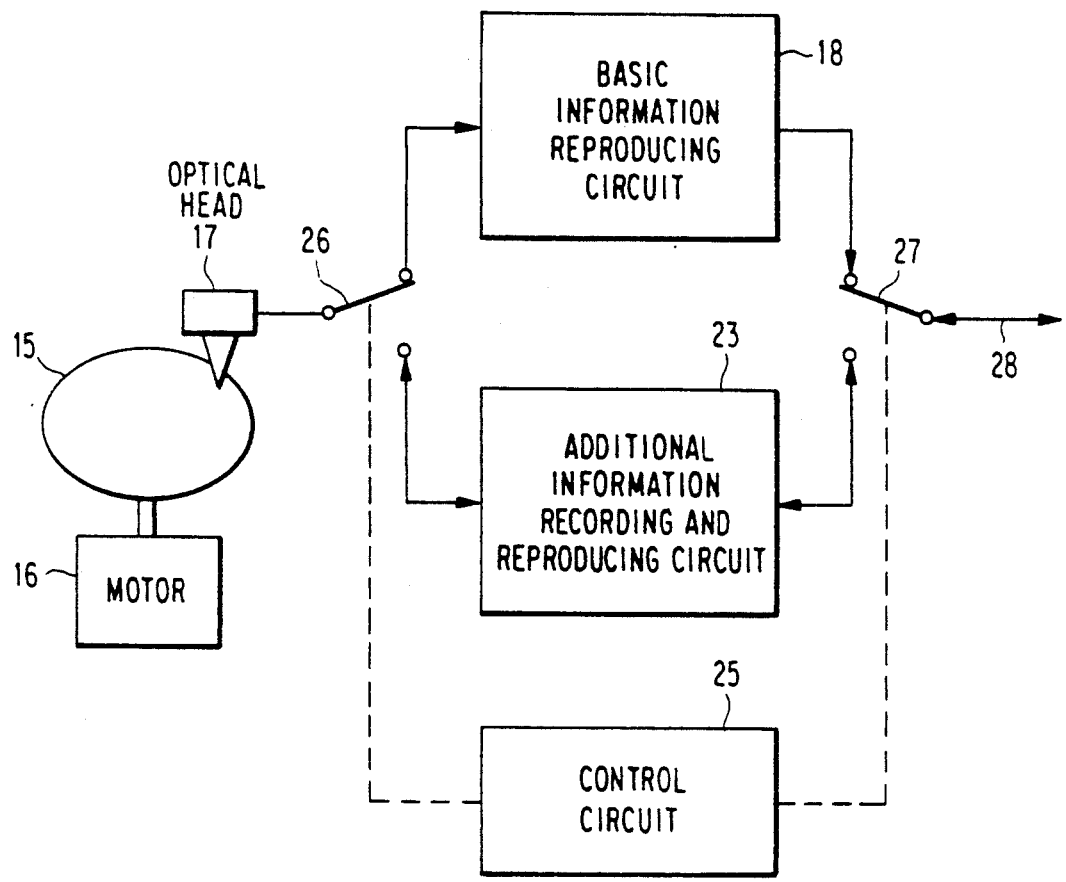
Figure 4:
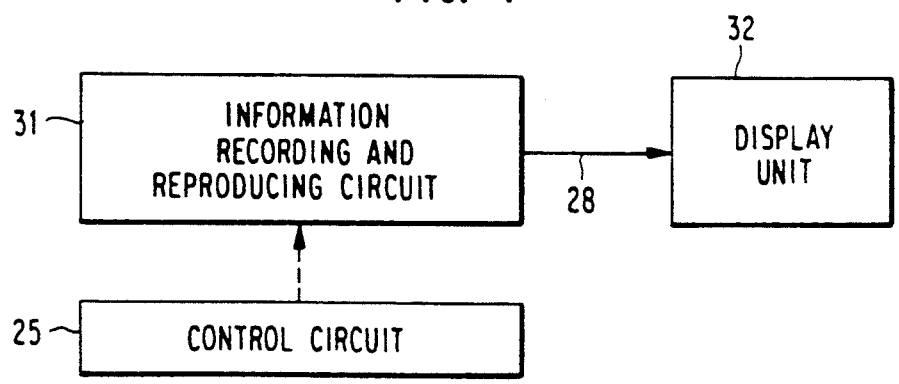

FIG. I is a block diagram of an optical disk device for an optical disk depicted in FIG. 1;

FIG. 3 is a schematic partial top view of an optical disk according to a second embodiment of this invention; and FIG. 4 is a block diagram of a modification of the optical disk device illustrated in FIG. 2.

DESCRIPTION OF THE PREFERRED EMBODIMENTS

Referring to FIG. 1, an optical disk will be generally described at first. The optical disk comprises a substrate disk 11 having a recording surface on which basic information is recorded in a first mode of using surface irregularities or surface deformations in correspondence to the basic information.

Typically, the surface irregularities consist of pits 12 formed along a basic recording track 14 (illustrated by one-dot and dashed line) with a land 12 left between two adjacent ones of the pits 12 in the manner known in a digital audio disk, a video disk, a compact disk (CD), a compact disk read-only memory (CD ROM), and other similar optical disks. Usually, the basic recording track 14 spirally surrounds a center hole 13 of the substrate disk 11. An aluminium or a like metal film (not shown) is formed as a reflecting film on the recording surface to make the pits 12 and the lands 12' reflect an optical beam incident on the recording surface. The basic information usually comprises address information or tracking information and data information.

In the manner which will later be exemplified, the pits 12 and the lands 12' have different lengths along the basic recording track 14 in accordance with the basic information. It is, however, possible to understand that the surface irregularities have a first density of record along the record track despite the different lengths of the pits 12 and the lands 12'.

Turning to FIG. 2 for a short while, an optical disk device is for use in connection with the optical disk indicated at 15. The optical disk device comprises an electric motor 16 for rotating the optical disk 15 on a disk axis which centrally passes through the center hole 13 perpendicularly of the recording surface. An optical head 17 runs relative to the optical disk 15 along the recording track 14. More particularly, the optical head 17 produces a coherent optical beam as a reading beam on reproducing or reading the basic information from the optical disk 15 with the coherent optical beam made to run along the recording track 14 as a light spot of a diameter of about one micron.

The reading beam is reflected by the recording surface as a read beam, which has a beam intensity varied by the pits 12 and the lands 12′, namely, by the surface irregularities in compliance with the basic information. Responsive to the read beam, the optical head 17 produces an output electric signal as a basic information signal representative of the basic information. Supplied with the basic information signal from the optical head 17 in the manner which will presently become clear, a basic information reproducing circuit 18 reproduces the basic information as a basic reproduction.

Reviewing FIGS. 1 and 2, an optical disk has been used only in reproducing or reading the information which is preliminarily recorded on the recording surface as basic information. In other words, it has been impossible for a reader of the basic information to voluntarily add additional information, such as an underscore or a comment, to the basic information. It has also been impossible for an author of the basic information to amend a part of the basic information either by deletion of the part or by addition of additional information to the basic information. The deletion or rewriting of a part of the basic information is equivalent to the addition of additional information.

Referring more particularly to FIG. 1, the optical disk comprises a layer 21 of an information recording medium on the recording surface according to a first embodiment of the present invention. In the illustrated example, a magneto-optical recording medium is used as the information recording medium. At any rate, the information recording medium layer 21 is used instead of the reflecting film described above.

It is known in the art that information can be readily recorded or written in the layer 21 of the magneto-optical recording medium as magneto-optical irregularities by a laser beam produced as a recording or writing beam by the optical head 17 described in conjunction with FIG. 2. In correspondence to the addtional information, the magneto-optical irregularities are formed along an additional recording track 22 which is on the recording track 14, namely, relative to which the light spot runs on reading the basic information from the record surface. Since the basic information includes the data information, it is apparent that the additional information is recorded in the additional recording track at portions over the data information is recorded. It is therefore possible to desiredly record the additional information in the information recording medium layer 21 in addition to the basic information which is already recorded on the recording surface as the surface irregularities.

It will now be assumed that the optical head 17 directs a linearly polarized coherent beam as the reading beam towards the recording surface with the linearly polarized reading beam made to have a plane of polarization in a predetermined direction as a reference plane of polarization. Illuminated by the reading beam, the layer 21 of the magneto-optical recording medium sends another linearly polarized beam as the read beam back to the optical head 17 with the linearly polarized read beam given a plane of polarization which is subjected to polarization dependency in compliance with the optical irregularities. That is, the optical irregularities give rise to the polarization dependency so that the read beam has the beam intensity varied in accordance with the surface irregularities and a plane of polarization which is either identical with or is different from the reference plane of polarization according to the magneto-optical irregularities.

Responsive to the polarization dependency, the optical head 17 produces an additional electric signal as an additional information signal representative of the additional information. Due to a difference in planes of polarization, namely, a difference which the head beam has between the beam intensity and the plane of polarization, the optical head 17 can separate the basic information signal and the additional information signal from each other in the manner which will later be discussed. It is therefore possible to reproduce the additional information either singly or together with the basic information as will shortly be described more in detail.

It has been confirmed by the present applicant that the magneto-optical recording medium is preferably a known alloy of terbium (Tb), iron (Fe), and cobalt (Co). The alloy may be sputtered onto the record surface to a thickness T of about 800 angstrom units in the known manner.

When the alloy of terbium, iron, and cobalt is used as the magneto-optical recording medium, it is preferred to form an underlying film of silicon dioxide between the record surface and the layer 21 of the alloy and an overlying film of silicon dioxide on the layer 21 of the alloy. The silicon dioxide films are manufactured in the known manner. In FIG. 1, it should be understood for interpretation of the appended claims that the underlying and the overlying films are depicted by lines which primarily show the recording surface of the substrate disk 11 and an exposed surface of the information recording medium layer 21, respectively.

In FIG. 2, the optical disk device comprises an additional information recording and reproducing circuit 23. A control circuit 25 is coupled to first and second switches 26 and 27 which are depicted as mechanical switches merely for convenience of illustration. The control circuit 25 is manually operable to make the first switch 26 connect the optical head 17 selectively to the basic information reproducing circuit 18 and to the additional information recording and reproducing circuit 23 and to concurrently make the second switch 27 connect the basic information reproducing circuit 18 and the additional information recording and reproducing circuit 23 to a signal line 28 if the optical head 17 is connected to the basic information reproducing circuit 18 and to the additional information recording and reproducing circuit 23, respectively. The signal line 28 is connected to an input/output device. Alternatively, the signal line 28 is connected to an electronic digital computer. Neither of the input/output device and the digital computer is depicted.

When it is desired to record the additional information, the input/output device and the additional information recording and reproducing circuit 23 are used to make the optical head 17 record the additional information in the information recording medium layer 21 in the manner described before. On reading the additional information, the optical head 17 produces the additional information signal besides the basic information signal. The additional information recording and reproducing circuit 23 is used to reproduce from the additional information signal an additional reproduction representative of the additional information. The additional information recording and reproducing circuit 23 of this type is known in the art.

Referring now to FIG. 3, the pits 12 are illustrated by solid-line contours to exemplify the surface irregularities formed along the basic recording track 14 with the first density of record in the manner described before. In an optical disk according to a second embodiment of this invention, the optical irregularities are formed along the additional recording track 22 in the manner exemplified by dashed-line contours 29 with a second density which is lower than the first density.

When the additional information is recorded in the information recording medium layer 21 in this manner with the second density which has a density difference from the first density, it is possible to use a write-once or additional recording medium as the information recording medium. In other words, the optical irregularities may make a read beam have a beam intensity varied in compliance with the optical irregularities representative of the additional information.

It is known in the art that the write-once recording medium can be subjected to a change in color by a laser beam. In other words, the optical irregularities are caused by a difference in color. The dashed-line contours 29 therefore represents a record where the write-once recording medium has a different color. Preferably, the dashed-line contours 29 should have a minimum spacing which is at least twice a maximum spacing between the pits 12. This twice as wide a spacing is preferable also when the magneto-optical recording medium is used as the information recording medium.

The write-once recording medium is preferably either tellurium (Te) or a known alloy of tellurium, selenium (Se), and lead (Pb). Such a write-once recording medium may be vacuum processed onto the record surface by sputtering, evaporation, or vacuum deposition to a thickness between 200 and 400 angstrom units in the manner known in the art.

In FIG. 2, each of the basic information reproducing circuit 18 and the additional information recording and reproducing circuit 23 may comprise a band-pass filter which will later be discussed. Responsive to the basic information signal produced in accordance with the first density of record, the basic information reproducing circuit 18 reproduces the basic reproduction. Similarly, the additional information recording and reproducing circuit 23 reproduces the additional reproduction.

Reviewing FIGS. 1 and 3, the fact is now understood that the information recording medium layer 21 can be used for recording and reproducing of the additional information in a second mode which is different from the afore-mentioned first mode. Typically, the additional information is recorded with the magneto-optical or optical irregularities used as the second mode. It should be noted in this connection that the second density may be equal to the first density when the read beam represents the additional information by other than a variation in the beam intensity, such as a variation in the plane of polarization.

Reviewing FIG. 2, a combination of the control circuit 23 and the first switch 26 serves as a separating arrangement for manually separating the basic information signal and the additional information signal from each other when it is desired to separately read the basic and the additional information. For the sake of interpretation of the appended claims, it is possible to understand that the first switch 26 shows a separating arrangement for optically separating the basic and the additional information signals from each other without manual operation of the control circuit 25 although the optical head 17 is said hereinabove to separate the basic and the additional information signals from each other by a difference in planes of polarization. Alternatively, the first switch 26 shows a separating arrangement for separating the basic and the additional information signals by not resorting to the manual operation but to a difference between the first and the second densities of record although the band-pass filters are said heretobefore in the basic information reproducing circuit 18 and in the additional information recording and reproducing circuit 23. It is to be noted that such a separating arrangement is connected to the basic information reproducing circuit 18 and to the additional information recording and reproducing circuit 23 and that separation of the basic and the additional information signals results in separation of the basic and the additional reproductions from each other.

Referring now to FIG. 4, similar parts are designated by like reference numerals in a modification of the optical disk device illustrated with reference to FIG. 2. An information recording and reproducing circuit 31 includes the basic information reproducing circuit 18 and the additional information recording and reproducing circuit 23. The control circuit 25 and the signal line 28 are depicted separately of the information recording and reproducing circuit 31. A display unit 32 is connected to the signal line 28.

By manually controlling the control circuit 25, a reader of the basic information can make the information recording and reproducing circuit 31 make the display unit 32 visually display the basic reproduction of the basic information. When desired, the reader can control the control circuit 25 to make the information recording and reproducing circuit 31 add additional information to the basic information in the optical disk illustrated with reference to FIG. 1 or 3 while watching the basic reproduction on the display unit 32. As the case may be, whatever desired can be added as the additional information in a blank space of the basic information. The reader can control the control circuit 25 to make the display unit 32 display the basic reproduction together with the additional reproduction.

While this invention has thus far been described in specific conjunction with a few preferred embodiments thereof, it will now be readily possible for one skilled in the art to put this invention into practice in various other manners. For example, it is possible to use either the magneto-optical recording medium or the write-once recording medium on manufacturing the substrate disk 11. The basic information reproducing circuit 18 may be a basic information recording and reproducing circuit. The optical disk may have a known transparent layer on the information recording medium layer 21 and a pair of record surfaces on both principal surfaces of the substrate disk 11.

What is claimed is:

1. An optical disk device for reproducing and recording information comprising:
an optical disk including a substrate disk having a surface formed with a series of pits and lands along a basic recording track for recording basic information including address information and data information, and an additional recording layer formed on said surface and said substrate disk for recording additional information along an additional recording track, positioned above said basic recording track, in an additional form different from said series of pits and lands;

an optical head for irradiating an optical beam to said optical disk along said basic recording track and for receiving a reflected beam reflected from said optical disk to produce a reading signal including a basic information signal representative of a beam intensity of said reflected beam varied by said series of pits and lands and an additional information signal by detecting said additional form in said reflected beam;

a basic information reproducing circuit connected to said optical head via switching means for reproducing said basic information in response to said basic information signal;

an additional information recording and reproducing circuit connected to said optical head via said switching means for causing said optical head to record said additional information along said additional recording track by means of said optical beam in said additional form so as to add said additional information to said basic information, and for reproducing said additional information in response to said additional information signal; and control means for causing said switching means to connect said optical head to one of said basic information reproducing circuit and said additional information recording and reproducing circuit.

2. An optical disk as claimed in claim 1, wherein said additional recording layer is made of a magneto-optical recording medium.

3. An optical disk as claimed in claim 2, wherein the layer of said magneto-optical recording medium is about 800 angstrom units thick.

4. An optical disk as claimed in claim 3, wherein said magneto-optical recording medium is an alloy consisting essentially of terbium, iron, and cobalt.

5. An optical disk as claimed in claim 4, further comprising an underlying film of silicon dioxide between said surface of said substrate disk and the layer of said alloy and an overlying film of silicon dioxide on the layer of said alloy.

6. An optical disk device as claimed is claim 1, further comprising a display unit connected to said basic information reproducing circuit and to said additional information recording and reproducing circuit for visually displaying at least one of said basic and said additional signals.

* * * * *

UNITED STATES PATENT AND TRADEMARK OFFICE
CERTIFICATE OF CORRECTION

PATENT NO. : 5,166,913

DATED : November 24, 1992

INVENTOR(S) : Yoshikazu ICHIYAMA

It is certified that error appears in the above-identified patent and that said Letters Patent is hereby corrected as shown below:

```
Col. 2, line 21, delete "1", insert --2--;

line 23, delete "12", insert --12'--; and line 65, before "recording", insert --basic--.

Col. 3, line 1, before "recording", insert --basic--; and line 43, before "recording, insert --basic--.
```

Signed and Sealed this

Fourteenth Day of December, 1993

*Attest:*

BRUCE LEHMAN

*Attesting Officer*   Commissioner of Patents and Trademarks